June 20, 1950 — E. A. HAWK — 2,512,274
SUCTION HOLDING APPARATUS
Filed Jan. 29, 1948 — 4 Sheets-Sheet 1

Inventor
Elwin A. Hawk
By Frease and Bishop
Attorneys

June 20, 1950  E. A. HAWK  2,512,274
SUCTION HOLDING APPARATUS
Filed Jan. 29, 1948  4 Sheets-Sheet 2

Inventor
Elwin A. Hawk
By Frease and Bishop
Attorneys

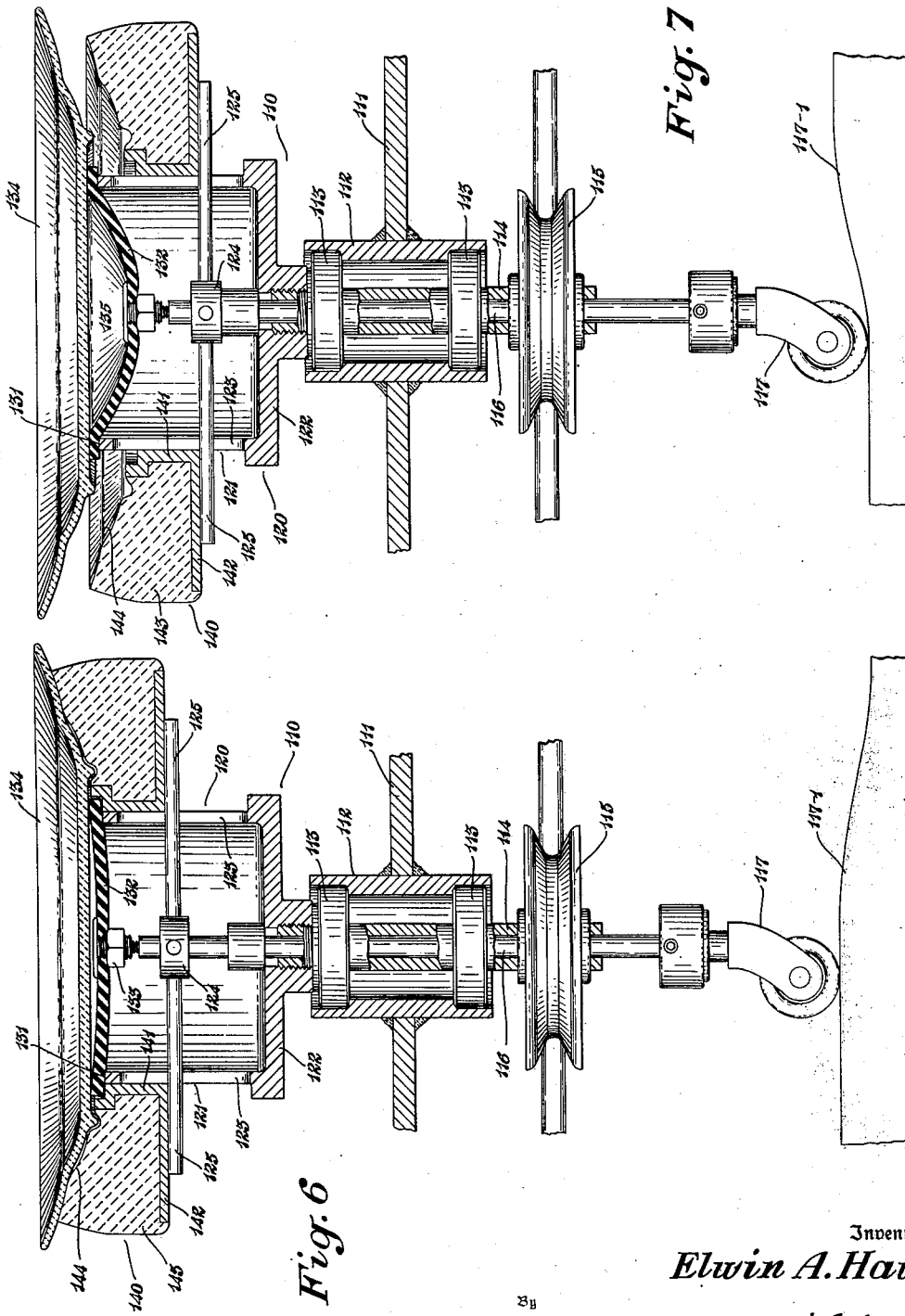

June 20, 1950 E. A. HAWK 2,512,274
SUCTION HOLDING APPARATUS
Filed Jan. 29, 1948 4 Sheets-Sheet 4
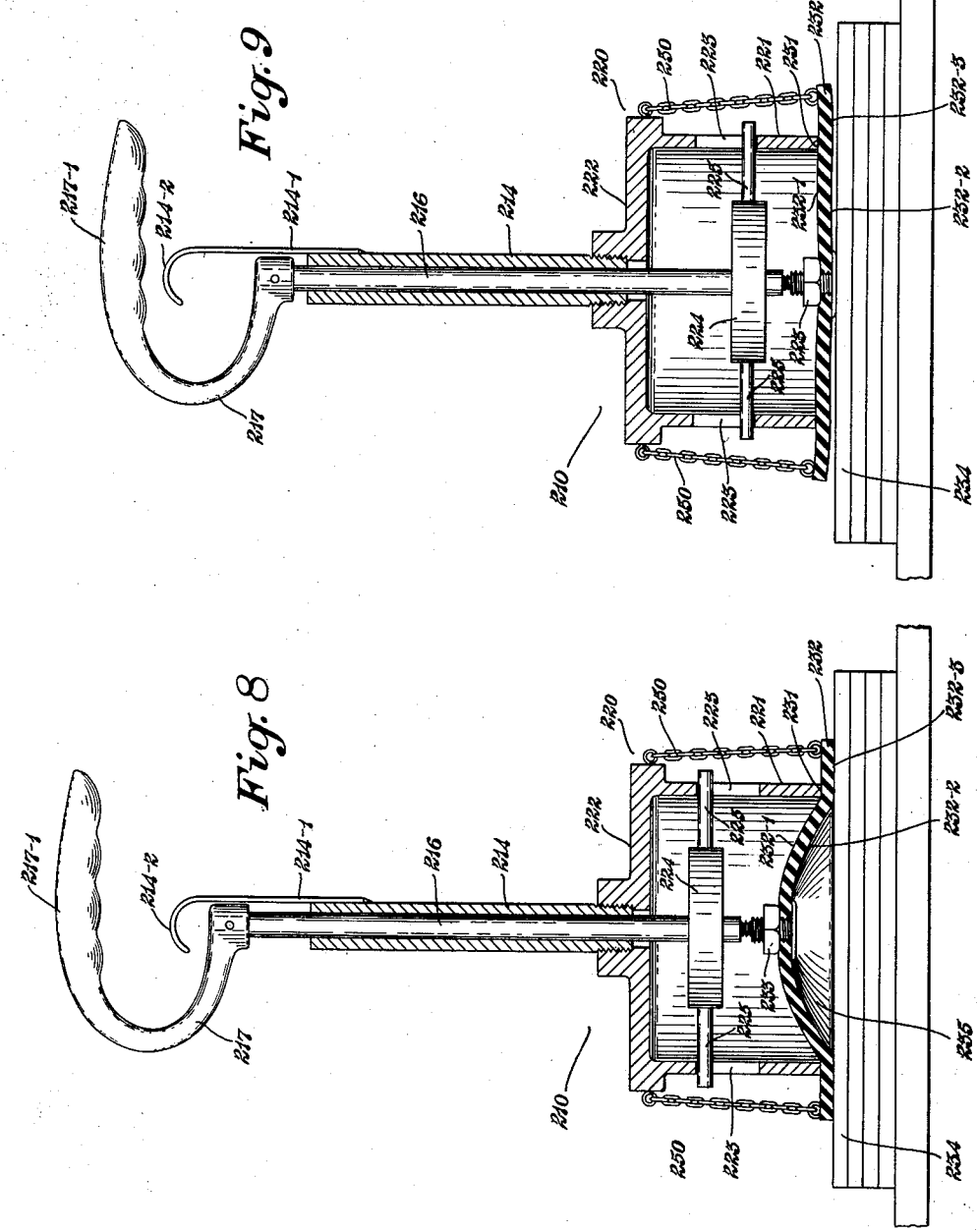
Inventor
*Elwin A. Hawk*
By
*Frease and Bishop*
Attorneys Patented June 20, 1950

2,512,274

UNITED STATES PATENT OFFICE 2,512,274

SUCTION HOLDING APPARATUS

Elwin A. Hawk, East Rochester, Ohio

Application January 29, 1948, Serial No. 5,083

5 Claims. (Cl. 279—3)

The invention relates to suction holding apparatus such as a vacuum chuck or a suction lifter. More particularly the invention relates in one form to a vacuum chuck adapted for holding a plate or other piece of dinnerware with the top surface of the plate uppermost, the chuck being adapted for rotation about a vertical axis while the plate or other piece of dinnerware is being decorated as by the application of a line of a compound of one of the noble metals such as gold, silver, and platinum, or other coloring material.

An applicator for applying a solution of such coloring material upon the top surface of a rotating piece of dinnerware is set forth in my application for U. S. Letters Patent Serial No. 721,126, filed January 9, 1947.

In the mass production of dinnerware decorated with a line of coloring material, a usual chuck includes an upper mold having an upper surface conforming to the lower surface of a particular piece of dinnerware such as a plate. There is required a separate mold for each size of dinnerware piece. The loading and unloading of successive pieces of dinnerware on the usual chucks takes considerable time and requires considerable skill on the part of the operator.

From another standpoint prior to the present improvements the holding force created by producing a suction or partial vacuum or subatmospheric pressure in a sealed space beneath a piece mounted on a chuck has not been utilized to any great extent, because it has been considered necessary to provide a suction or vacuum pump and a pipe line for producing the suction or partial vacuum or subatmospheric pressure in the sealed space beneath the piece held in the chuck.

Also from another standpoint any chuck for holding a piece of dinnerware while being subjected to a processing operation such as being decorated by a line of coloring material, should be adapted to center the piece.

In another form, the invention more particularly relates to a suction lifter adapted to lift objects having a flat surface such as sheet material including stainless steel, brass, copper, and other non-magnetic metal sheets, wallboard and other non-magnetic building boards, and the like.

The objects of the present invention include the provision of improved suction holding apparatus which may be embodied in a vacuum chuck particularly adapted for holding a piece of dinnerware while being subject to a processing operation such as the application of a line of coloring material on the outer edge of the piece of dinnerware.

Further objects of the present invention include the provision of such a vacuum chuck adapted for holding a piece of dinnerware or similar article while being subject to a processing operation such as the application of a line of coloring material on its top surface, and which also includes means operative to automatically center each piece of dinnerware as it is loaded on the chuck.

Further objects of the present invention include the provision of such a vacuum chuck in which the loading and unloading of successive pieces of dinnerware or similar articles may be accomplished very rapidly.

Further objects of the present invention include the provision of improved suction holding apparatus which may be embodied in a suction lifter adapted to lift objects having a flat or substantially flat surface.

Further objects of the present invention include the provision of such suction holding apparatus in which the parts are of simplified construction and arrangement, whereby the parts may be rapidly and economically manufactured, and easily and correctly assembled and disassembled, so that the chuck may be economically produced and maintained.

The foregoing and other objects are attained by the suction holding apparatus, parts, combinations, and subcombinations, which comprise the present invention and the nature of which is set forth in the following general statement and preferred embodiments of which are set forth in the following description, and which are particularly and distinctly pointed out and set forth in the appended claims forming part hereof.

The nature of the improved suction holding apparatus of the present invention may be stated in general terms as including an annular diaphragm seat member having at one end a flat edge. A diaphragm of resilient material, preferably rubber or a rubber compound, is seated upon the flat end of the annular member.

Means connected with the center of the diaphragm and operating within the annular member are provided for changing the conformation of the diaphragm from a flat conformation to a dished or depressed conformation. When the diaphragm is flat it has no holding force upon an object abutted by the diaphragm. When the annular seat member holds an annular zone of the diaphragm against an object and the central portion of the resilient diaphragm within the annular zone is pulled away from the object, the central portion of the diaphragm is domed over the opposite face of the object, and there is formed between the domed central portion of the diaphragm and the opposite face of the object a sealed suction chamber in which there is a partial vacuum, or in other words in which the pressure is subatmospheric, with the result that the external atmospheric pressure tightly holds the annular zone of the diaphragm in engagement with the object, and thus the object is held by the diaphragm as long as it is domed and the seal is maintained.

By way of example, preferred embodiments of the improved suction holding apparatus, and of improved parts thereof, are illustrated in the accompanying drawing forming part hereof, in which:

Figure 6 is a vertical sectional view of a second embodiment of the improved suction holding apparatus in the form of a vacuum chuck, the diaphragm being substantially flat and a plate being shown in its position just after being placed on the chuck, and before the doming of the diaphragm;

Figure 7 is a similar vertical sectional view of the suction holding apparatus as shown in Fig. 6 after the diaphragm has been domed and is holding the plate;

Figure 2:
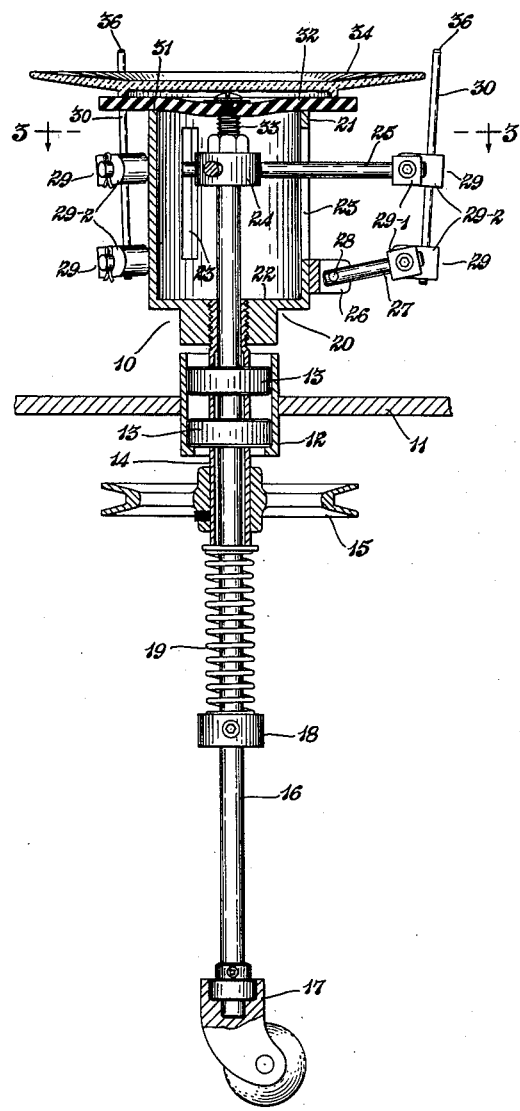
Fig. 2 is a vertical sectional view thereof as on line 2—2, Fig. 1, showing a plate on the diaphragm when the diaphragm is substantially flat and having no holding power on the plate, the plate having been just placed upon the diaphragm or having been subject to a processing operation and being ready for being unloaded.
Figure 1:
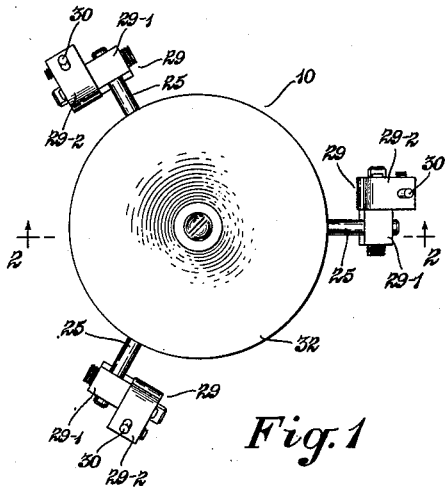
Figure 1 is a top plan view of one embodiment of the improved suction holding apparatus in the form of a vacuum chuck.
Figure 3:
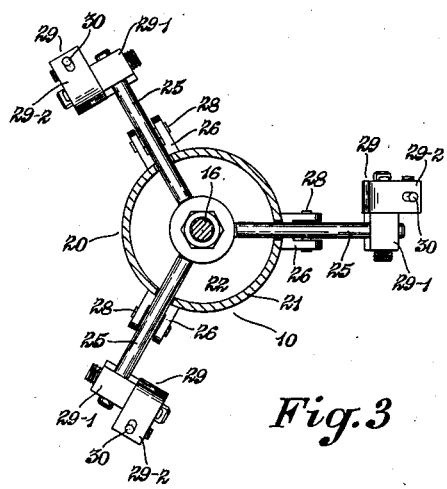
Fig. 3 is a transverse sectional view thereof as on line 3—3, Fig. 2.

Figure 8 is a vertical sectional view of a third embodiment of the improved suction holding apparatus in the form of a suction lifter for lifting objects having a flat surface such as sheet material such as non-magnetic sheet aluminum, the parts of the suction lifter being shown in their relative positions when the diaphragm is in engagement with a sheet of non-magnetic material and ready to lift the same; and Figure 9 is a similar view showing the improved suction lifter and its parts in their relative positions for releasing a sheet of non-magnetic material.

Similar numerals refer to similar parts throughout the drawings.

One embodiment of the improved suction holding apparatus in the form of a vacuum chuck is shown in Figs. 1 to 5, inclusive, and is indicated generally by 10 and includes a horizontal base plate 11 having a circular opening formed therein in which is located and secured to the base plate 11 a tubular bearing sleeve housing 12, and a pair of ball bearings 13 are carried in the sleeve housing 12.

Within the bore of the inner raceways of the ball bearing 13 there is fitted and secured a tubular shaft 14 having a vertical axis of rotation. Below the base plate 11 and the lower end of the sleeve housing 12 there is secured on the tubular shaft 14 a V-pulley 15 which is associated with belt and motor drive means not shown for rotating the tubular shaft 14 and the parts mounted thereon.

In the bore of the tubular shaft 14 there is slidably guide mounted for longitudinal movement a vertical rod 16 which extends above and below the upper and lower ends of the tubular shaft 14. On the lower end of the rod 16 there is secured a vertically swiveled caster 17 which operates on a raising and lowering cam not shown. Between the lower end of the rod 16 and the lower end of the tubular shaft 14 there is adjustably secured a collar 18 and between the collar 18 and the lower end of the tubular shaft 14 there is interposed a compression spring 19 which urges the rod 16 downwardly against the raising and lowering cam.

On the upper end of the tubular shaft 14 there is secured an annular diaphragm seat member indicated generally by 20, which as shown is in the form of an upwardly opening cup having an upper cylinder wall 21 at the lower end of which there is a bottom wall 22 which has a central internally threaded vertical opening screwed upon external threads at the upper end of the tubular shaft 14. In the cylinder wall 21 there are formed a plurality of vertical slots 23. Within the cylinder wall 21 there is secured on the rod 16 adjacent its upper end a collar 24, and a horizontal link arm 25 extends through each slot 23 in the cylinder wall 21, and the inner end of each horizontal link arm 25 is secured to the collar 24.

Below the lower end of each slot 23 there is mounted on the cylinder wall 21 a pivot bracket 26, and there is provided a plurality of laterally extending swinging link arms 27 each having its inner end provided with a pivotal connection 28 with one of the pivot brackets 26. On the outer end of each swinging link arm 27 there is mounted horizontally pivoting joint means 29, and similarly on the outer end of each horizontal link arm 25 there is mounted a horizontally pivoting joint means 29.

Each horizontally pivoting joint means 29 includes adjustable sleeve members 29—1 and 29—2, and one of the sleeve members 29—1 is adjustably mounted on the outer end of the horizontal link arm 25 and another of the sleeve members 29—1 is adjustably mounted on the outer end of the swinging link arm 27. A dinnerware centering arm 30 extends through each set of the sleeve members 29—2, and each sleeve member 29—2 is secured to the centering arm 30, each sleeve 29—1 and 29—2 being secured to the connected arm by set screw means as shown. Each centering arm 30 extends upwardly at one side of the annular diaphragm seat member 20.

The top 31 of the upper cylinder wall 21 of the annular diaphragm seat member 20 is flat and provides an annular seat upon which rests a diaphragm 32 of resilient material, preferably rubber or a rubber compound. The upper end 33 of the rod 16 has a screw connection with the center of the diaphragm 32.

In Fig. 2 the diaphragm 32 is shown substantially flat, and a plate 34 is seated on the top of the diaphragm 32, the plate 34 having been just placed upon the diaphragm 32 or having been subjected to a processing operation and being ready for being unloaded.

Figure 4:
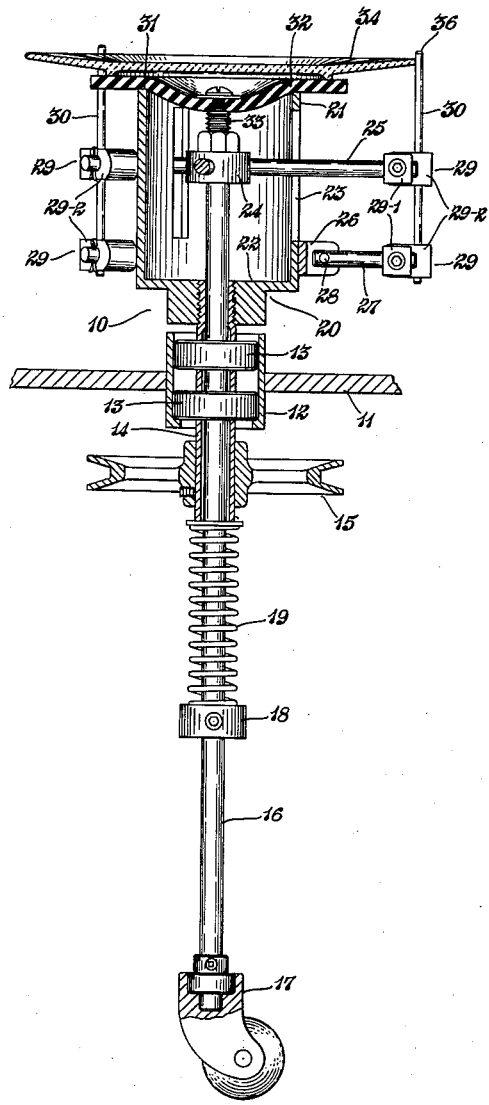
Fig. 4 is a view similar to Fig. 2, showing a plate loaded upon the diaphragm and the diaphragm being partially domed, and the parts of the centering means being shown in their position after having effected the centering of the plate.

When the plate 34 has just been placed upon the diaphragm 32 movement of the rod 16 downwardly as by action of the spring 19 as the caster 17 passes over a depressed portion of a can, not shown, serves to partially depress or dome the diaphragm 32 and simultaneously to produce a movement of the centering bar 30 against the side of the plate 34 serving to center the plate on top of the diaphragm, as shown in Fig. 4.

Figure 5:
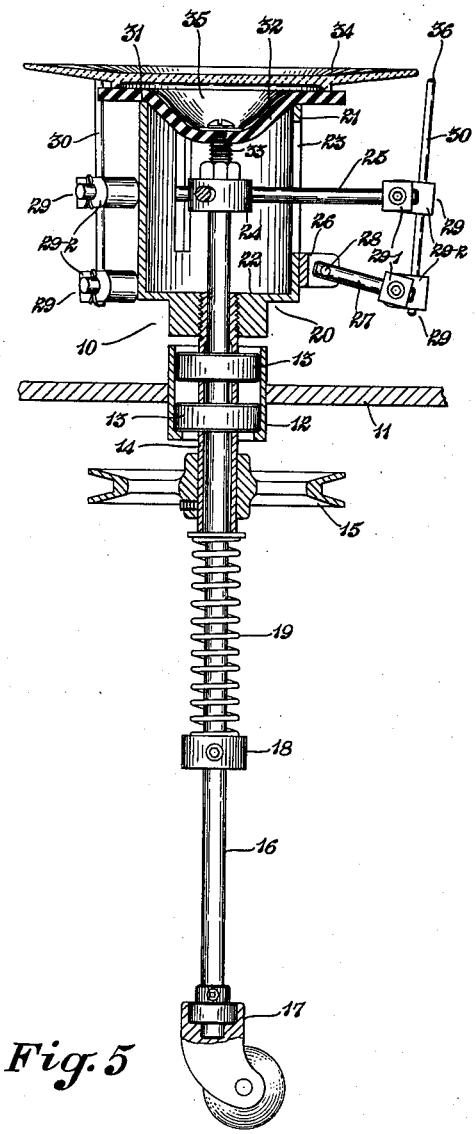
Fig. 5 is a view similar to Figs. 2 and 4 showing the diaphragm completely domed and holding the plate, and showing the centering means withdrawn from the side of and below the plate, the top of the plate being clear and ready for being subjected to an applicator of coloring material or similar operation.

Further downward movement of the rod 16, as shown in Fig. 5, serves to completely depress or dome the diaphragm 32 producing a sealed space or chamber 35 in which the pressure is subatmospheric, thereby holding the plate 34 during a subsequent processing operation which as shown includes rotation of the pulley 15, the tubular shaft 14, the annular diaphragm seat member 20, the plate 34 thereon, and the rod 15 and attached parts.

Moreover, when the diaphragm 32 is completely depressed, as shown in Fig. 5, the centering bars 30 are moved so that their upper ends 36 are at one side of and below the top edge of the plate 34, permitting operation of an applicator such as set forth in my application for U. S. Letters Patent Serial No. 721,126, filed January 9, 1947, for the purpose of applying a line of coloring material to the outer edge of the plate 34.

A second embodiment of the improved suction holding apparatus is shown in Figs. 6 and 7, and is also in the form of a vacuum chuck indicated generally by 110, and includes a horizontal base plate 111 having a circular opening formed therein in which is located and secured to the base plate 111 a tubular bearing sleeve housing 112 and a pair of ball bearings 113 are carried in the sleeve housing 112.

Within the bore of the inner raceways of the ball bearing 113 there is fitted and secured a tubular shaft 114 having a vertical axis of rotation. Below the base plate 111 and the lower end of the sleeve housing 112 there is secured on the tubular shaft 114 a V-pulley 115 which is associated with belt motor drive means for rotating the tubular shaft 114 and the parts mounted thereon.

In the bore of the tubular shaft 114 there is slidably guide mounted for longitudinal movement a vertical rod 116 which extends above and below the upper and lower ends of the tubular shaft 114. On the lower end of the rod 116 there is secured a vertically swiveled caster 117 which operates on a raising and lowering cam 117—1.

On the upper end of the tubular shaft 114 there is secured an annular diaphragm seat member indicated generally by 120, and which as shown is in the form of an upwardly opening cup including an upper cylinder wall 121 at the lower end of which there is a bottom wall 122 which has a central internally threaded vertical opening screwed upon external threads on the upper end of the tubular shaft 114. In the cylinder wall 121 there are formed a plurality of vertical slots 123. Within the cylinder wall 121 there is secured on the rod 116 adjacent its upper end a collar 124, and a horizontal arm 125 extends from the collar 124 through each slot 123 in the cylinder wall 121.

The top 131 of the upper cylinder wall 121 of the annular diaphragm seat member 120 is flat and provides an annular seat upon which rests a diaphragm 132 of resilient material, preferably rubber or a rubber compound. The upper end 133 of the rod 116 has a screw connection with the center of the diaphragm 132.

A plate centering ring indicated generally by 140 has a central metal sleeve 141 with a bore fitting on the cylinder wall 121, the lower end of the sleeve 141 resting on the upper sides of the arms 125, and an annular flat flange 142 extending outwardly from the sleeve 141, and supporting a ring mold 143 formed of plaster of Paris or similar material and having an upper face 144 conforming to the bottom face of a plate 134 and serving to center the plate on the diaphragm 132.

In Fig. 6 the diaphragm 132 is shown substantially flat, the plate 134 having been just placed upon the diaphragm 132 or having been subjected to a processing operation and being ready for being unloaded.

In Fig. 7 the parts of the improved chuck 110 are shown in their relative positions when the diaphragm 132 is depressed or domed downwardly below the bottom of the plate 134 and within an annular zone of the diaphragm 132 seated upon the flat upper end 131 of the cylinder wall 121, the doming of the diaphragm being effected by dropping of the caster 117, the rod 116, the arms 125, and the centering ring 140, the caster 117 having dropped from a high point on the cam 117—1 to a low point.

The downward depression or doming of the diaphragm 132 produces between the diaphragm 132 and the bottom of the plate 134 a sealed space or chamber 135 in which the pressure is subatmospheric, thereby holding the plate 134 during a subsequent processing operation, which as shown includes rotation of the pulley 115, the tubular shaft 114, the annular diaphragm seat member 120, the plate 134 on the diaphragm 132, and the rod 116 and attached parts, thereby permitting operation of an applicator such as set forth in my application for U. S. Letters Patent, Serial No. 721,126, filed January 9, 1947, for the purpose of applying a line of coloring material to the outer edge of the plate 134.

A third embodiment of the improved suction holding apparatus is shown in Figs. 8 and 9, and is in the form of a suction lifter indicated generally by 210, and includes an elongated sleeve 214 in the preferably cylindric bore of which there is slidably mounted for longitudinal movement a preferably cylindric rod 216 which extends beyond the opposite ends of the sleeve 214. On one end of the rod, which is the upper end as shown, and which is uppermost in the usual operating position, there is secured a handle 217, which may be as shown a side opening ovally curved handle. On the similarly located end of the sleeve 214 there is secured one end of a lifter rod 214—1, and the other lifter hook end 214—2 of the rod 214—1 curves inwardly into the side opening of the handle 217. The handle 217 includes a laterally extending grip portion 217—1 above the hook end 214—2.

On the opposite end of the sleeve 214, which is the lower end as shown, there is secured an annular diaphragm seat member indicated generally by 220, and which as shown is in the form of a cup including a cylinder wall 221, which is lowermost as shown, and on one end of which, the upper end as shown, there is a transverse wall 222 which has a central internally threaded opening screwed upon external threads on the connected end of the sleeve 214. In the cylinder wall 221 there are formed a plurality of vertical slots 223. Within the cylinder wall 221 there is secured on the rod 216 adjacent its end within the cylinder wall 221 a preferably massive collar 224, and an arm 225 extends laterally from the collar 224 through each slot 223 in the cylinder wall 221.

The outer end 231 of the cylinder wall 221 of the annular diaphragm seat member 220 is a flat annular end, and a diaphragm 232 of resilient material, preferably rubber or a rubber compound, has a seat face 232—1 opposite and abutting the flat annular end 231 of the diaphragm seat member 220. The end 233 of the rod 216 within the cylinder wall 221 has a screw connection with the center of the diaphragm 232. The diaphragm 232 includes an outer face 232—2.

In the diaphragm 232, an outer annular zone 232—3 extends over the flat annular end 231 of the diaphragm seat member 220, and a plurality of connecting members preferably flexible connecting chain members each indicated by 250 each connects the outer periphery of the diaphragm annular zone 232—2 with the outer side of the annular seat member 220, preferably as shown at the junction of the cylinder wall 221 with the transverse wall 222.

The suction lifter 210 may be used to hold or lift any object having a flat exposed face against which the outer face 232—2 of the diaphragm 232 may be abutted, and the suction lifter 210 is particularly adapted for lifting sheet material, and particularly non-magnetic sheet material such as sheet aluminum, ply wood, and the like. In Fig. 8 the suction lifter 210 is shown in position just ready to lift a top sheet 234 from a pack of sheet material, the outer face 232—2 of the diaphragm 232 having been abutted against the upper face of the top sheet 234, and the handle 217 having been lifted upwardly thereby lifting the rod 216 and the central portion of the diaphragm 232 within the zone 232—3 producing the sealed chamber 235 in which the pressure is sub-atmospheric, and the zone 232—3 being sealed against the top sheet 234 by the external atmospheric pressure.

After the sheet 234 has been lifted by the suction lifter 210 and transported as to the top of another pack of sheets as shown in Fig. 9, the handle 217 is released and the weight thereof and of the rod 216 and the massive collar 224 cause the dropping of the diaphragm 232 whereby lifting the hook end 214—2 lifts the tube 214, the seat member 220, and through the connecting members 250, the annular zone 232—3 of the diaphragm 232, breaking the seal between the annular zone 232—3 and the sheet 234, thereby releasing the suction lifter 210 from the sheet 234. The suction lifter 210 is then ready for another lifting or holding operation.

The embodiments of the present invention illustrated and described herein are by way of example, and the scope of the present invention is not limited to the same or to the particular details thereof but is commensurate with any and all novel subject matter contained herein which may at any time properly under the patent laws be set forth in the claims hereof or originating herein, and the elements of any such claims are intended to include their functional or mechanical equivalents.

I claim:

1. In suction holding apparatus, a diaphragm seat member having a flat annular end, a diaphragm of resilient material having an outer face and an opposite seat face abutting in an annular zone of the diaphragm the flat annular end of the diaphragm seat member, and means connected with the diaphragm for changing the conformation of the diaphragm from a substantially flat conformation to a domed conformation, whereby an object abutting the outer face of the diaphragm is loose when the diaphragm is substantially flat, and whereby when the diaphragm is domed a sealed chamber is formed between the object and the diaphragm, the sealed chamber engirdled by the flat annular end of the diaphragm seat member and the abutting annular zone of the diaphragm, and the pressure in the sealed chamber being sub-atmospheric and the object being held on the abutting annular zone of the diaphragm, and means operative during the changing of the conformation of the diaphragm to center the object on the diaphragm with respect to the flat annular end of the diaphragm seat member.

2. In suction holding apparatus, a diaphragm seat member having an upper flat annular end, a diaphragm of resilient material having an outer face and an opposite seat face abutting in an annular zone of the diaphragm the upper flat annular end of the diaphragm seat member, and means connected with the diaphragm for changing the conformation of the diaphragm from a substantially flat conformation to a domed conformation, whereby an object abutting the outer face of the diaphragm is loose when the diaphragm is substantially flat, and whereby when the diaphragm is domed a sealed chamber is formed between the object and the diaphragm, the sealed chamber being engirdled by the upper flat annular end of the diaphragm seat member and the abutting annular zone of the diaphragm, and the pressure in the sealed chamber being sub-atmospheric and the object being held on the abutting annular zone of the diaphragm, and means operative during the changing of the conformation of the diaphragm to center the object on the diaphragm with respect to the flat annular end of the diaphragm seat member.

3. In suction holding apparatus, a cup having a cylinder wall and a bottom wall, the cup having a diaphragm seat end, a diaphragm of resilient material seated upon the diaphragm seat end of the cylinder wall, a tubular shaft having one end connected with the cup bottom wall, means mounting the tubular shaft for rotation, and a rod slidable in the tubular shaft, the rod having one end connected with the diaphragm, and object centering arms operatively associated with the cup and with the rod for movement to center an object on the diaphragm during movement of the rod changing the conformation of the diaphragm.

4. In suction holding apparatus, a cup having a cylinder wall and a bottom wall, the cup having a diaphragm seat end, a diaphragm of resilient material seated upon the diaphragm seat end of the cylinder wall, a tubular shaft having one end connected with the cup bottom wall, means mounting the tubular shaft for rotation, and a rod slidable in the tubular shaft, the rod having one end connected with the diaphragm, and object centering arms operatively associated with the cup and with the rod for movement to center an object on the diaphragm during movement of the rod changing the conformation of the diaphragm, and spring means urging the rod to move so as to change the conformation of the diaphragm.

5. In suction holding apparatus, a cup having a cylinder wall and a bottom wall, the cup having a diaphragm seat end, a diaphragm of resilient material seated upon the diaphragm seat end of the cylinder wall, a tubular shaft having one end connected with the cup bottom wall, means mounting the tubular shaft for rotation, and a rod slidable in the tubular shaft, the rod having one end connected with the diaphragm, and means for centering an object on the diaphragm.

ELWIN A. HAWK.

REFERENCES CITED

The following references are of record in the file of this patent:

UNITED STATES PATENTS

| Number | Name | Date |
|---|---|---|
| 1,104,252 | Dunham | July 21, 1914 |
| 1,147,102 | Knabe | July 20, 1915 |
| 2,203,572 | Johnson | June 4, 1940 |
| 2,311,525 | Ebbs | Feb. 16, 1942 |

FOREIGN PATENTS

| Number | Country | Date |
|---|---|---|
| 3,660 | Great Britain | Feb. 15, 1910 |